United States Patent [19]

Schaad et al.

[11] Patent Number: 6,062,651
[45] Date of Patent: May 16, 2000

[54] DEVICE FOR DETACHABLE FASTENING OF AN AUXILIARY WHEEL TO A WHEEL OF A VEHICLE

[75] Inventors: Fritz Johann Schaad, Subingen; Rudolf Schaad, Deitingen, both of Switzerland

[73] Assignee: Gebr. Schaad AG Raderfabrik, Subingen, Switzerland

[21] Appl. No.: 09/066,289

[22] PCT Filed: Oct. 31, 1996

[86] PCT No.: PCT/CH96/00384

§ 371 Date: Apr. 27, 1998

§ 102(e) Date: Apr. 27, 1998

[87] PCT Pub. No.: WO97/17215

PCT Pub. Date: May 15, 1997

[30] Foreign Application Priority Data

Nov. 3, 1995 [CH] Switzerland ............................. 3125/95

[51] Int. Cl.⁷ ..................................................... B60B 11/10
[52] U.S. Cl. ........................................................... 301/40.2
[58] Field of Search .................................. 301/36.1, 40.2

[56] References Cited

U.S. PATENT DOCUMENTS

| 3,237,992 | 3/1966 | Kiesau | 301/36 |
| 3,328,088 | 6/1967 | Olson | 301/36 |
| 3,836,202 | 9/1974 | Bonomo | 301/39 |
| 4,005,907 | 2/1977 | Bonomo | 301/40.2 X |
| 4,220,372 | 9/1980 | Johansen et al. | 301/40.2 X |
| 4,351,568 | 9/1982 | Ahlschwede | 301/36 |

FOREIGN PATENT DOCUMENTS

| 0084979 | 8/1983 | European Pat. Off. . |
| 0094916 | 11/1983 | European Pat. Off. . |
| 0572876 | 12/1993 | European Pat. Off. . |
| 2505742 | 11/1982 | France . |

*Primary Examiner*—D. Glenn Dayoan
*Attorney, Agent, or Firm*—Dann, Dorfman, Herrell and Skillman, P.C.; Henry H. Skillman

[57] ABSTRACT

In a device for detachable fastening of an auxiliary wheel (2) to a wheel (1) of a vehicle, at least one tensioning device (3) is provided with which the auxiliary wheel can be tensioned against the wheel (1) via a distance sleeve (10). The tensioning device (3) has an anchor part (13) which is connected by a wheel bowl of the rim (4) of the wheel (1), and which is provided with an aperture (18) which has a passage (20) with a narrowing (19). A head (21) of a connecting rod (14) can be inserted into the aperture (18) of the anchor part (13), which head is held in the anchor part (13). Disposed on the connecting rod end (14) opposite the head (21) is a tensioning element (15) which can be hung up and tensioned in a part of the rim (8) of the auxiliary wheel (2). With this device the auxiliary wheel (2) can be easily tensioned on the wheel (1), the tensile forces which arise being optimally transmitted.

7 Claims, 3 Drawing Sheets

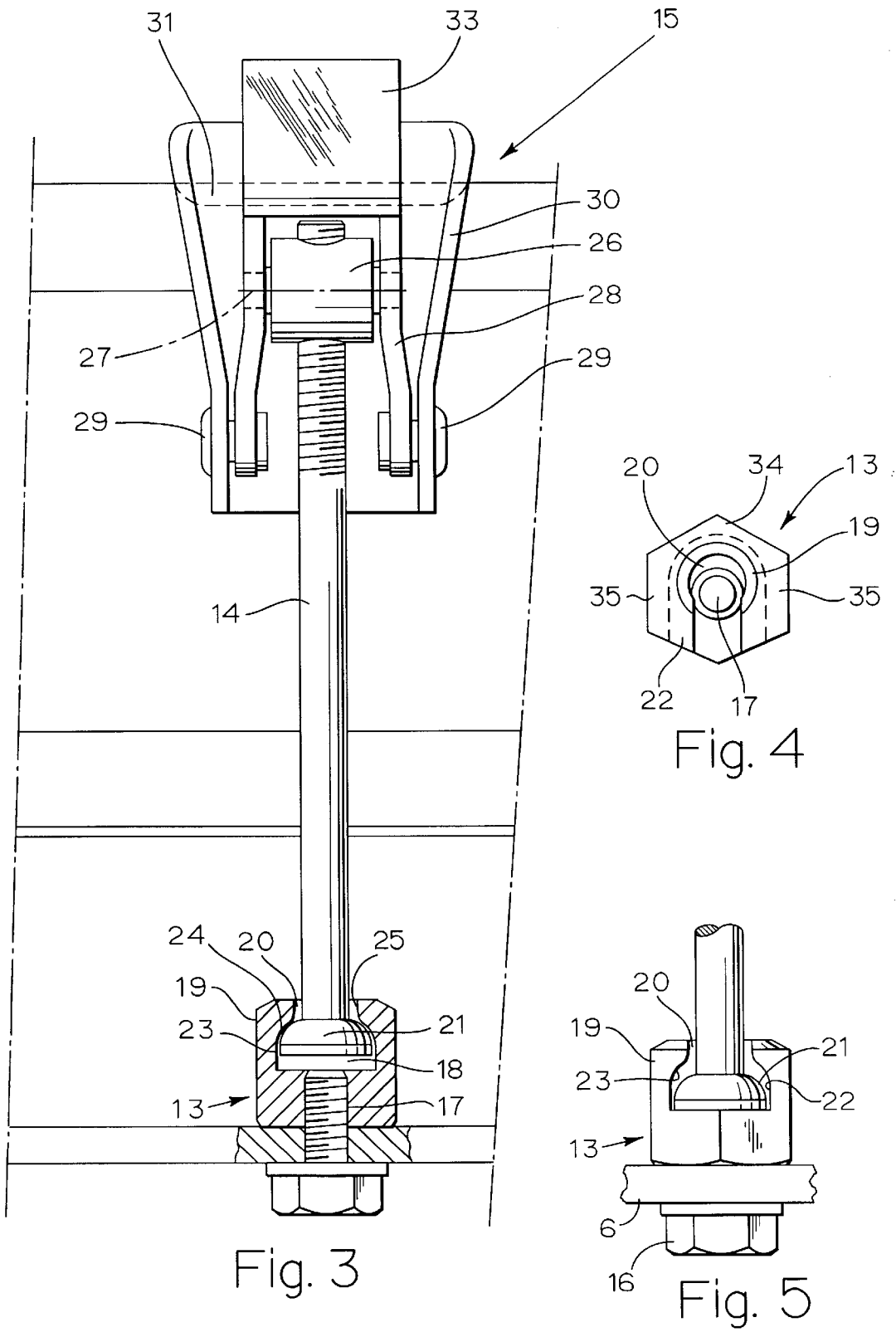

DEVICE FOR DETACHABLE FASTENING OF AN AUXILIARY WHEEL TO A WHEEL OF A VEHICLE

FIELD OF THE INVENTION

This invention relates to a device for detachable fastening of an auxiliary wheel to a wheel of a vehicle, in particular an agricultural vehicle.

BACKGROUND OF THE INVENTION

It is often necessary with agricultural vehicles to enlarge the supporting surface of the wheel for tilling the fields in order to keep the soil pressure at a minimum. This is achieved by mounting an auxiliary wheel on each of the wheels of the vehicle. The mounting and the removal of these auxiliary wheels should be achieved quickly and without great effort, since driving on roads with the mounted additional tires is often not allowed owing to the over-dimensional width. Therefore it should also be possible to mount and remove the auxiliary wheels in the field, for example.

Also in the case of other vehicles, for example construction machines, which have to be driven in open country, it can be advantageous if the supporting surface of the wheels can be enlarged, for example to prevent sinking in a soft subsoil. The same device can be used here as for the aforementioned agricultural vehicle.

Devices of this kind are known. In these devices ring bolts are installed on the wheel of the vehicle, preferably on the wheel bowl, distributed about the circumference. Engaging in the ring of each of these bolts is a hook, which is formed at one end of the connecting rod. The other end of the connecting rod engages in a hook which can be tensioned, which can be hung on the rim of the auxiliary wheel, and which can be firmly tensioned via a tension lever. The auxiliary wheel is hereby tensioned against a distance sleeve, mounted between the two wheels, and is tensioned with this sleeve on the wheel of the vehicle. The adjustment of the length of the tensioning means takes place by turning the connecting rod, which is screwed into the tensioning element via a threading. A device of this kind is described, for example, in EP-A-0 084 979.

A similar installation is described in U.S. Pat. No. 3,836, 202. Here, too, a connecting rod is used whose one end is shaped as a hook and can be hung in a ring-shaped screw fastened to the wheel. The other end of the connecting rod is provided with a threading on which a tensioning nut is screwed, which is supported on a claw which can be hung in the auxiliary wheel. To tension the tensioning means, the tensioning nut must be tightened by means of screw spanner.

The driving forces of the wheel must also be transmitted to the auxiliary wheel through this prior art device tensioning means, disposed distributed about the circumference. Consequently the force to be absorbed by the tensioning means is relatively great. This means that the hook, which can be hung in the ring bolt, must be dimensioned big, or the number of tensioning means provided for attaching the auxiliary wheel must be increased. Nevertheless there is the risk that the hook of an individual tensioning means might bend or even break.

The object of the present invention therefore consists in improving the transmission of forces from connecting rod to anchor part such that the corresponding elements can be dimensioned small so that material can be saved, or in the case of the same dimensioning, the number of tensioning means per wheel can be reduced so that costs can be lowered and the mounting and removal of the auxiliary wheel can be achieved with less effort.

SUMMARY OF THE INVENTION

The inner annular surface of the anchor part, on which the head of the connecting rod is supported, is preferably designed with a concave, spherical shape, the head being provided with a corresponding spherical form. The transmission of forces can thereby take place optimally when the connecting rod is situated in an inclined position with respect to the anchor part, for which purpose the passage of the anchor part has an outwardly opening conical shape. Inclined positions of this kind can result in particular with driven wheels in that the auxiliary wheel turns relative to the wheel of the vehicle, and through the inclined position of the connecting rods of the tensioning means, the pressing pressure of the auxiliary wheel is increased.

In that the anchor part is provided with a recess running transversely from outside to the passage, so that the head of the connecting rod can be driven laterally out of, or respectively into, the anchor part, a simple mounting and removal of the auxiliary wheel is possible. Moreover, the anchor parts can remain fastened to the wheel, for example, even when the auxiliary wheel is not mounted.

A preferred embodiment of the invention consists in the anchor part having on the back side a bore, provided with a threading, by means of which bore the anchor part can be firmly screwed to the wheel of the vehicle.

In order to achieve greater strength of the transition anchor part-head of the connecting rod, the narrowing with the annular surface, on which the head is supported, is set back toward the remaining walling of the anchor part in the direction opposite to the recess running transversely to the passage. Stronger side walls result thereby in the area of the recess.

Further preferred embodiments of the invention result from the further dependent claims.

BRIEF DESCRIPTION OF THE DRAWINGS

An embodiment of the device according to the invention will be explained more closely in the following, by way of example, with reference to the enclosed drawing. Shown are:

FIG. 3, which is a top view of a tensioning means with the anchoring part shown in section;

FIG. 4, which is an end view of the anchoring part with the connecting rod removed; and FIG. 5, which is a plan view of the anchoring part shown in FIG. 2, with the tension released.

Figure 1:
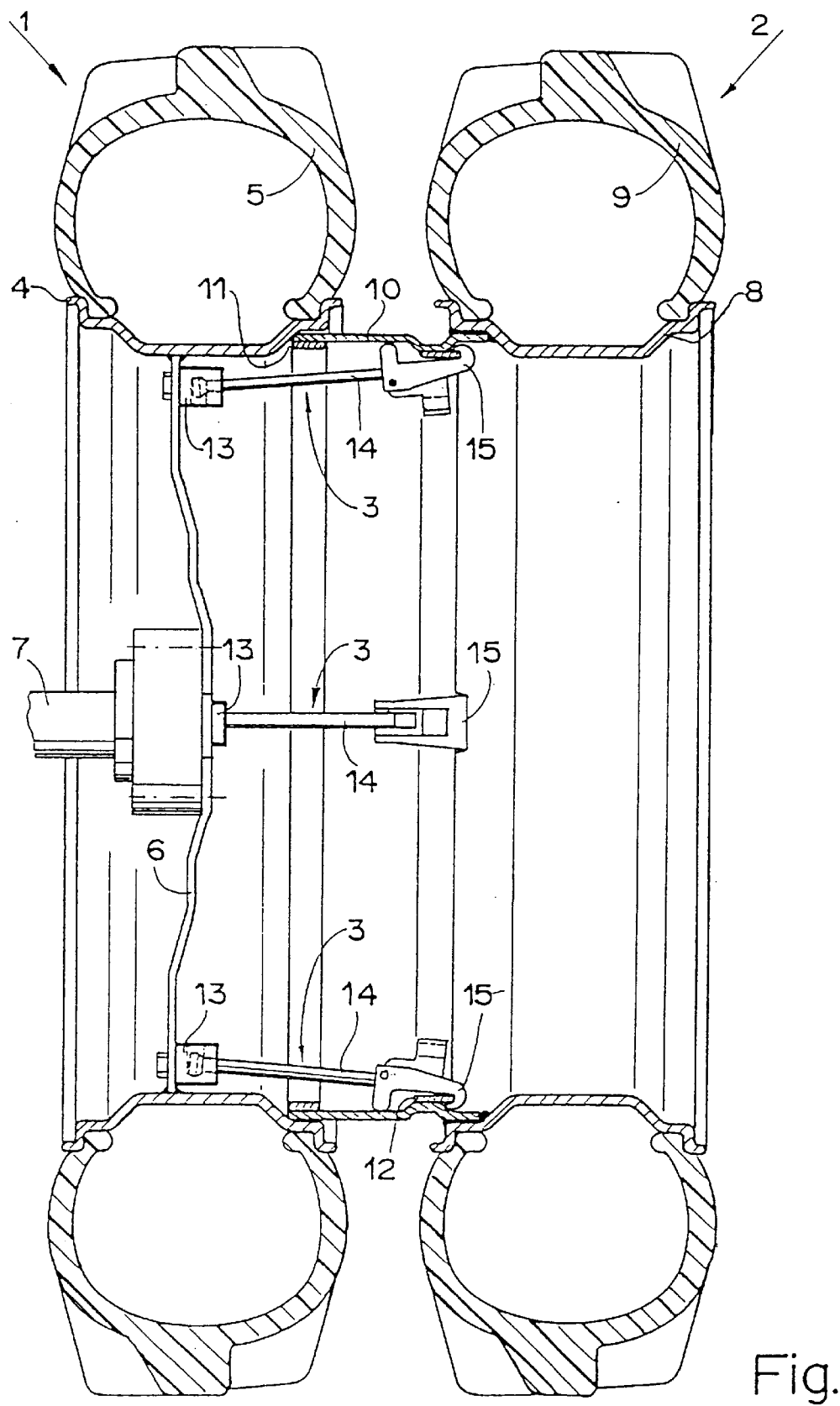
FIG. 1, which is a section through a wheel of a vehicle with an auxiliary wheel mounted thereon through tensioning means.

Shown in FIG. 1 is a wheel 1 with an auxiliary wheel 2 fastened thereon via tensioning means 3. The wheel 1 consists of a rim 4 on which a tire has been mounted. A wheel bowl 6 is fixed inside the rim 4, by means of which wheel bowl the wheel 1 is fixed, for example, to the drive shaft 7 of a vehicle (not shown) by means of screws.

The auxiliary wheel 2 likewise consists of a rim 8, on which a tire 9 has been mounted. Fastened to the rim 8 of the auxiliary wheel 2 is a distance sleeve 10 in the form of an annular spacer. This distance sleeve 10 supports itself on a shoulder 11 of the rim 4 of the wheel 1, when the auxiliary wheel 2 has been mounted on the wheel 1.

Mounted on the inner side of the distance sleeve 10 is a surrounding web plate 12, which is firmly connected to the distance sleeve 10.

Fastened to the wheel bowl 6, distributed about the circumference, are anchor parts 13 of the tensioning means 3, preferably in the vicinity of the rim 4. With each anchor part 13 an end region of a connecting rod 14 can be held, whose other end is provided with a tensioning element 15. Each tensioning element 15 can be hung in the surrounding web plate 12 of the distance sleeve 10 and can be tensioned, by means of which the auxiliary wheel 2 with the distance sleeve 10 is tensioned against the wheel 1. Several tensioning means 3 can be disposed over the circumference of a wheel 1, depending upon the size of the wheels 1 and 2 to be connected, upon the dimensioning of the tensioning means 3 and upon the size of the forces to be transmitted. Two tensioning means 3 suffice for minimal requirements; to meet greater demands it could be four or more tensioning means 3.

It is also conceivable that in the case of small wheels 1 and 2, in particular if they are not driven, only one tensioning means 3 is used, which is installed in the center of the wheels 1 and 2. The auxiliary wheel 2 could likewise be provided with a wheel bowl, in the center of which a hanging element for the tensioning element 15 would be disposed.

Figure 2:
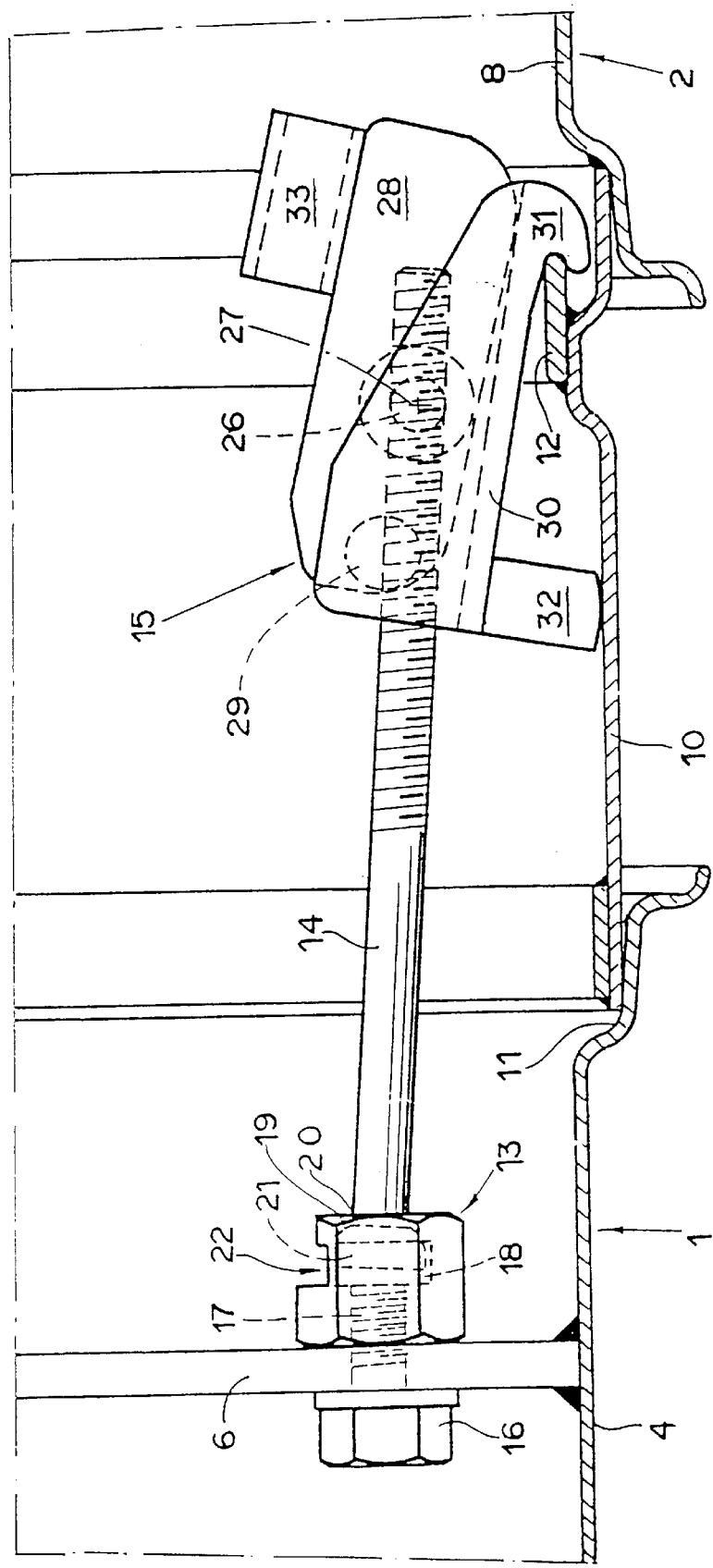
FIG. 2, which is a side view of a tensioning means with the anchoring part, partially in section.

Visible in FIG. 2 is the rim 4 of the wheel 1 to which the wheel bowl 6 is fixed. By means of screw 16, the anchor part 13 is fixed to the wheel bowl 6 in that this screw engages in a threaded bore 17 of the anchor part 13. The anchor part 13 has an aperture 18, which is provided with an axial passage 20 having a narrowing 19. A head 21 of the connecting rod 14 is held by the narrowing 19.

The anchor part 13 has a radial recess 22 running transversely from outside to the passage 20, through which recess the head 21 of the connecting rod 14 can be driven laterally out of, or respectively into the aperture 18 of, the anchor part 13 in the unloaded state.

As is especially visible in FIG. 3, the narrowing 19 of the anchor part 13 is provided with an inner annular surface 23, designed with a concave, spherical shape. The head 21 of the connecting rod 14 has a corresponding, convex, spherical shape 24, which cooperates with the annular surface 23. The passage 20 of the anchor part 13 is provided with an outwardly flared conical shape 25. By means of the spherical design of the inner annular surface 23 and of the head 21, and by means of the conical shape 25 of the passage 20, the connecting rod 14 can be inclined with respect to the anchor part 13 by a certain amount in any direction, the transmission of forces from the connecting rod 14 to the anchor part 13 always being optimal also in the inclined position.

As can be seen from FIGS. 2 and 3, the area of the connecting rod 14 remote from the head 21 is provided with a threading. The connecting rod 14 can thereby be screwed into a threaded bushing 26, which is held pivotable about an axis 27, in a tension lever 28 of the tensioning element 15. The tension lever 28, for its part, is pivotably connected to the tensioning hook 30 by means of hinge pin 29. At the distal end, the tensioning hook 30 has a catch hook 31.

By screwing the connecting rod 14 into the threaded bushing 26 of the tensioning element 15, the distance between the anchor part 13 and the tensioning element 15 can be set precisely, so that the tension force becomes optimal. This exact setting is made possible by the head 21, which is held optimally in the anchor part 13 in every turning position.

Shown in FIG. 2 is the tensioning element 15 in a tensioned state, which means that the tensioning hook 30 is hung up in the surrounding web plate 12 of the distance sleeve 10, and the rim 8 of the auxiliary wheel 2 is tensioned against the wheel 1 via the distance sleeve 10, the distance sleeve 10 supporting itself on the shoulder 11 of the rim 4 of the wheel 1. The tensioning hook 30 has a support foot 32 in its region remote from the catch hook 31, which support foot ensures that this area of the tensioning hook 30 is spaced apart from the distance sleeve 10.

To release the tensioning element 15, an auxiliary rod is pushed into the bracket 33 of the tension lever 28, whereby the tension lever 28 is pivoted away about the axis 27 of the threaded bushing 26 a in counterclockwise direction. This pivotal movement displaces the hinge pin 29 to move in an arc about the pivot axis, whereby the tensioning hook 30 is moved toward the auxiliary wheel 2, and the catch hook 31 moves out of the web plate 12. Tensioning takes place in reverse sequence.

As can be seen from FIGS. 2, 3 and 4, the narrowing 19 extends between the aperture 18 and the passage 20. The recess 22 is key-shaped and extends from outside to the aperture 18 and to both the aperature 18 and the passage 20. The narrowing 19 is set back from the passage 20 toward the remaining wall 34 of the anchor part 13. Stronger side walls result therefrom in the area of the recess 22 and the aperature 18, the tensile strength of the anchor part 13 being improved where of the head 21 engages the annular surface 23 of the narrowing 19.

The anchor part 13 can essentially have any desired circumferential shape. This circumferential shape is preferably hexagonal so that the anchor part 13 can be held with a hexagonal key for screwing onto the wheel bowl 6.

With this device the tension forces, which result when putting an auxiliary wheel 2 on the wheel 1, are optimally absorbed and transmitted. The mounting and removal of the auxiliary wheel 2 on, or respectively from, the wheel 1 can be carried out very easily.

What is claimed is:

1. A device for detachably fastening an auxiliary wheel to a main wheel of a vehicle, said wheels each having a circumference and a rim extending around said circumference, said device comprising an annular spacer supported at opposite ends on said rims, and a plurality of tensioning means disposed about said circumferences to tension the auxiliary wheel against the main wheel via said annular spacer, at least one of said rims having a wheel bowl, each of said plurality of tensioning means comprising an anchor part connected to said wheel bowl of said one rim, a connecting rod having a head engaging said anchor part at one of its ends and having a hook member at the opposite of its ends, said hook member adapted to engage the other of said rims, and releasable tension means to tension said connecting rod and tension said hook member when engaged with the other of said rims, said anchor part having an outside, an internal aperture receiving said head, an internal passage receiving said connecting rod, an internal narrowing between said aperture and said passage, and a recess extending from said outside to said aperture, said narrowing and said passage, whereby said connecting rod may be detached from said anchor part through said recess when said tension means is released.

2. A device according to claim 1 wherein said narrowing has an inner annular concave spherical shaped surface, and said head has a complementary convex spherical shaped surface adapted to bear against said narrowing surface, said passage having a conical shape flaring outwardly from said narrowing.

3. A device according to claim 1, wherein said anchor part has wall opposite said passage, and a threaded bore in said wall for connecting said anchor part to said bowl.

4. A device according to claim 1, wherein said anchor part has a wall opposite said passage, said internal narrowing being set back from said passage toward said wall, said narrowing being spaced from said wall a distance to permit said head to pass through said recess when said tension is released.

5. A device according to claim 1, wherein said plurality of tensioning means include a common web plate fixed to and surrounding said other of said rims, said hook member of each tensioning means engaging said web plate when said tension means is operative.

6. A device according to claim 1, wherein said connecting rod of said tensioning means includes a threaded end portion remote from said head, and said hook member includes a threaded bushing to adjustably engage said connecting rod to said hook member.

7. A device according to claim 1, wherein each of said releasable tensioning means includes a tension lever connected to the end portion of said connecting rod remote from said head, said tension lever being connected to said hook member and operable to releasably tension said hook member when engaged with the other of said rims.

* * * * *